US011788489B2

(12) United States Patent
Jodet et al.

(10) Patent No.: US 11,788,489 B2
(45) Date of Patent: Oct. 17, 2023

(54) THRUST REVERSER CASCADE INCLUDING ACOUSTIC TREATMENT

(71) Applicant: SAFRAN AIRCRAFT ENGINES, Paris (FR)

(72) Inventors: Norman Bruno André Jodet, Moissy-Cramayel (FR); Jéremy Paul Francisco Gonzalez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 80 days.

(21) Appl. No.: 17/608,265

(22) PCT Filed: Apr. 3, 2020

(86) PCT No.: PCT/EP2020/059560
§ 371 (c)(1),
(2) Date: Nov. 2, 2021

(87) PCT Pub. No.: WO2020/224887
PCT Pub. Date: Nov. 12, 2020

(65) Prior Publication Data
US 2022/0325680 A1      Oct. 13, 2022

(30) Foreign Application Priority Data
May 3, 2019   (FR) ..................... 1904654

(51) Int. Cl.
*F02K 1/72*      (2006.01)
*F02C 7/24*      (2006.01)
(Continued)

(52) U.S. Cl.
CPC ............... *F02K 1/72* (2013.01); *B64D 33/06* (2013.01); *F02C 7/24* (2013.01); *F02K 1/827* (2013.01);
(Continued)

(58) Field of Classification Search
CPC ... F02K 1/72; F02K 1/827; F02C 7/24; B64D 33/06; F05D 2220/323; F05D 2240/129;
(Continued)

(56) References Cited

U.S. PATENT DOCUMENTS 5,706,649 A * 1/1998 Robinson ................ F02K 1/008
60/229
6,256,980 B1 * 7/2001 Lecordix .................. F02K 1/72
239/265.29
(Continued)

FOREIGN PATENT DOCUMENTS

FR         2 947 869 A1      1/2011

OTHER PUBLICATIONS

International Search Report dated Jun. 4, 2020 in PCT/EP2020/059560 filed on Apr. 3, 2020, 2 pages.
(Continued)

*Primary Examiner* — Andrew H Nguyen
(74) *Attorney, Agent, or Firm* — Oblon, McClelland, Maier & Neustadt, L.L.P.

(57) ABSTRACT

A cascade for a thrust reversal device intended to be mounted on a turbomachine of an aircraft, the cascade including first partitions extending in a first direction, second fixed partitions extending in a second direction orthogonal to the first direction, and a frame inside which the first and second partitions extend, the frame including at least two fixed walls extending according to the first direction, and at least one part of each first partition extending between two second partitions. At least one first partition is mobile according to the second direction between a first position wherein the first partition is distant, in the second direction, from the fixed walls to form a plurality of resonating cavities with the first partitions and/or the fixed walls, and a second (Continued)

position wherein the one first partition is in contact with a fixed wall or another first partition.

17 Claims, 3 Drawing Sheets

(51) Int. Cl.
 *F02K 1/34* (2006.01)
 *F02K 1/82* (2006.01)
(52) U.S. Cl.
 CPC .. *F05D 2240/129* (2013.01); *F05D 2260/963* (2013.01)
(58) Field of Classification Search
 CPC ............. F05D 2260/57; F05D 2260/96; F05D 2260/963
 See application file for complete search history.

(56) References Cited

U.S. PATENT DOCUMENTS

2017/0370325 A1\* 12/2017 Fert ........................... F02K 1/70
2019/0032601 A1  1/2019 Harpal et al.

OTHER PUBLICATIONS

French Preliminary Search Report (with English translation of Categories of Cited Documents) dated Jan. 9, 2020 in French Application 1904654 filed on May 3, 2019, 3 pages.

\* cited by examiner

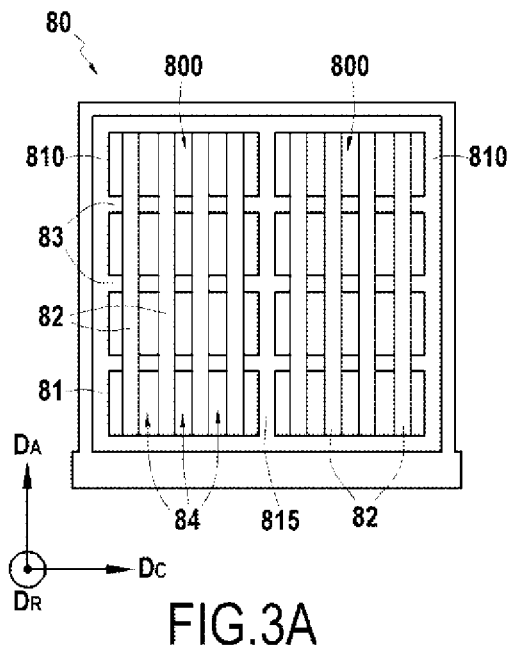
FIG.3A
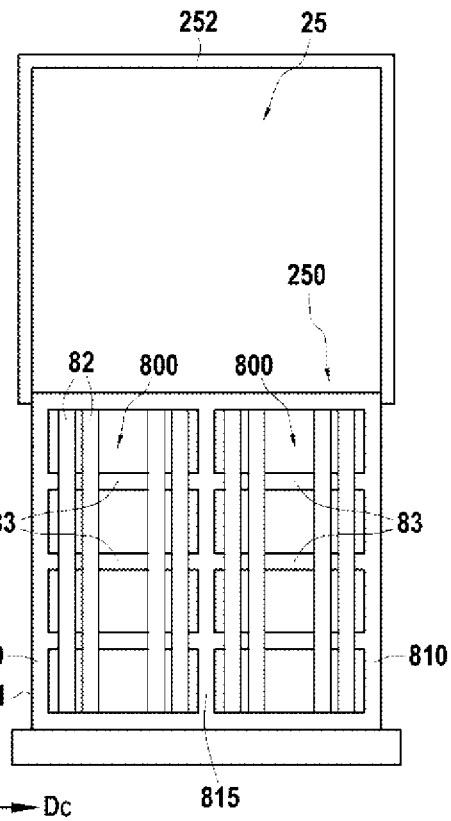
FIG.3B
Fig. 4
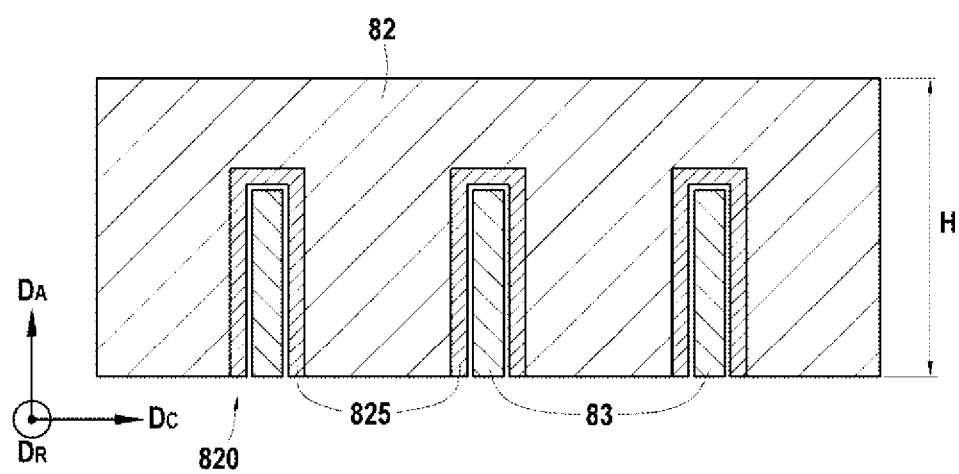

THRUST REVERSER CASCADE INCLUDING ACOUSTIC TREATMENT

TECHNICAL FIELD

The invention relates to the acoustic treatment of sound waves emitted by a turbomachine of an aircraft, and more particularly the treatment of sound waves in the region of the thrust reversers of the turbomachine.

PRIOR ART

When a turbomachine is operating, the interaction between the flow and the solid parts of the turbomachine is responsible for generating noises which propagate on either side of the turbomachine.

One of the means of attenuating this acoustic radiation is to integrate acoustic treatment means in the region of surfaces in contact with sound waves.

In conventional terms, acoustic treatment of a turbojet, and more precisely of the noise radiated by the interaction between the rotor and its environment, is carried out by way of absorbent panels arranged in the region of the wet surfaces of the conduit in which the sound waves spread. Wet surfaces are those surfaces in contact with a fluid flow. These panels are generally composite materials of sandwich type enclosing a honeycomb sound absorption forming cells.

The prior art for example discloses acoustic panels having a single degree of freedom, SDOF, which present a classic honeycomb structure of acoustic treatment panels lining the walls of the nacelle of a turbomachine.

By way of the operating principle of acoustic treatment panel technologies using resonating cavities, the radial bulk, that is, the radial thickness, of the acoustic treatment panels depends on the specific frequency of treatment for obtaining maximum efficiency in terms of acoustic damping.

However, engine architectures are more and more exhibiting increasingly slow impeller rotation speeds and an increasingly small number of vanes on the impellers, causing a drop in dominant frequencies of the noise associated with the module comprising the fan and the stator stage, or "OGV fan" module for "Outlet Guide Vane". Because of this, the adequacy between the optimal thickness of the acoustic panels and the bulk available in the nacelles is currently not being satisfied.

A turbomachine generally comprises thrust reversers for slowing down an aircraft. There are two main thrust reverser technologies which are based on the action of a cascade. Two types of cascade thrust reversers are distinguished: fixed cascade thrust reversers and slide link cascade thrust reversers.

FIGS. 1A and 1B show schematic sectional views in a longitudinal plane of a turbomachine 1 according to a first embodiment known from the prior art in an inactivated thrust reversal position and in an activated thrust reversal position respectively.

The turbomachine 1 comprises a nacelle 2 in rotational symmetry around an axis X defining an axial direction $D_A$, a radial direction $D_R$ and a circumferential direction $D_C$, a fan 3, a primary vein 4, a secondary vein, a primary stator stage 5, a secondary stator stage 6, and a cascade thrust reversal device 7 comprising a cascade 8.

As illustrated in FIGS. 1A and 1B which show a turbomachine fitted with a fixed cascade thrust reverser, in fixed cascade thrust reversers the cascade 8 is encased, that is, attached to an upstream part 21 of the nacelle 2 and slide-linked with a downstream part 22 of the nacelle 2, the upstream and the downstream parts being defined relative to the direction of flow of a gas flow F in the turbomachine 1. When moving in the downstream direction, the downstream part 22 of the nacelle 2 discovers the cascade 8 which becomes the sole interface between the flow internal to the nacelle 2 and the surrounding environment in which the turbomachine 1 develops.

FIGS. 2A and 2B show schematic sectional views in a longitudinal plane of a turbomachine 1 according to a second embodiment known from the prior art respectively in an inactive thrust reversal position and in an activated thrust reversal position.

As is illustrated in FIGS. 2A and 2B which show a turbomachine 1 fitted with a slide link cascade thrust reverser, in fixed cascade thrust reversers the cascade 8 is slide-linked relative to the upstream part 21 of the nacelle 2 and flush-mounted relative to the downstream part 22 of the nacelle 2. As it moves downstream, the downstream part 22 of the nacelle 2 draws the cascade 8 out of the nacelle 2 to position it at the interface between the flow internal to the nacelle 2 and the surrounding environment.

Thrust reversers altogether represent a highly detrimental cost, mass and bulk for performance of the propulsion system, while they are utilised solely for the purpose of the landing phase. The volume they take up in the nacelle cannot especially be used, in the prior art, for acoustic treatment of sound waves emitted by the turbomachine.

In propulsion system architectures using thrust reversers with doors which deploy inside the secondary flow to deflect the upstream flow outside the nacelle, a practice known as integration of classic acoustic treatment consists of incorporating acoustic panels into cavities of reverser doors. This practice consists simply of incorporating classic absorbent panels in the available volumes, as is done for the fan casing.

DISCLOSURE OF THE INVENTION

The invention aims to provide a cascade of a cascade thrust reverser which, when the cascade is mounted in a thrust reverser of a turbomachine, both reorients a flow of air in the upstream direction of the turbomachine outside the nacelle, minimises load losses through the cascade and maximises acoustic absorption efficiency.

An aim of the invention proposes a cascade for a thrust reversal device intended to be mounted on a turbomachine of an aircraft, the cascade comprising first partitions extending in a first direction, second fixed partitions extending in a second direction orthogonal to the first direction, and a frame inside which the first and second partitions extend, the frame comprising at least two fixed walls extending according to the first direction, and at least one part of each first partition extending between two second partitions in a plane comprising the first and second directions.

According to a general characteristic of the invention, at least one first partition is mobile according to the second direction between a first position in which said at least one first partition is distant, in the second direction, from said fixed walls of the frame to form a plurality of resonating cavities with the first partitions and the fixed walls of the frame, and a second position in which said at least one first partition is in contact with a fixed wall or another first partition.

In general, in the prior art, the number of cells differs considerably between a reverser cascade and an acoustic panel. This difference is due to the preferred properties which are not the same.

A thrust reversal cascade is usually characterised by a metallic structure, sized so as to hold the aerodynamic load to which it is subjected in thrust reversal phase. This structure also generates load losses. A cell is a volume constituted by four walls through which fluid can circulate. Having an excessive cell density can impair the efficiency of the thrust reverser due to excessive resistance to the passage of the air.

On the other hand, acoustic panel structures are not subject to aerodynamic force. The partitions which constitute them are very fine and their low volume optimises the tuning frequency of the panel, that is, the maximal damping frequency.

The two functions of thrust reversal and acoustic treatment therefore call on very different cell structures.

The second partitions are intended to be oriented according to a direction orthogonal to the direction of flow of a gas flow inside a turbomachine comprising a thrust reversal device fitted with such a cascade. When the cascade is mounted on a thrust reversal device on a turbomachine, the second partitions, oriented according to an azimuthal or radial direction of the turbomachine, are indispensable to ensuring the functionality of thrust reversal. In fact it is because of these second partitions that the airflow circulating in a vein, inside the nacelle in which the thrust reversal device is mounted, can be captured and reoriented to upstream of the turbomachine outside the nacelle, relative to the direction of flow of the flow inside the nacelle.

The first partitions are intended to be oriented according to the direction of gas flow inside a turbomachine comprising a thrust reversal device fitted with such a cascade. When the cascade is mounted on a thrust reversal device on a turbomachine, the first partitions, oriented according to an axial direction of the turbomachine, are not indispensable for the functionality of thrust reversal. However, they enable the formation of resonating cavities for attenuating acoustic waves generated by the turbomachine.

The mobility according to the second direction of at least one first partition of the cascade according to the invention offers the possibility of modifying the number of cells of the cascade as a function of the operating mode of the cascade, to have for example, for the same given volume in the first direction between two second partitions or a second partition and the frame, a single large cell or else at least two smaller cells as a function of the number of second mobile partitions. In other words, the mobility of at least one first partition has the number of cells vary to limit this number in 'thrust reversal' mode, and to boost this number in 'acoustic treatment' mode.

In a first aspect of the cascade each first mobile partition can comprise notches configured to house a second partition and allow said first partition to move along the second partitions, and each notch can comprise a seal for sealing the notch.

This conformation improves the formation of cells in resonating cavities when the cascade is operating in acoustic treatment mode by limiting acoustic leaks between the cells.

In a second aspect of the cascade, the seals of the notches can be brush seals or tongue seals.

In a third aspect of the cascade, the cascade can comprise at least two first mobile partitions and at least one translation system of first partitions comprising an actuator and at least two tie rods comprising a first and second ends, the second ends of the tie rods of the same translation system being connected together to form a common pivot link connected to the actuator, and the first end of each tie rod of the same translation system being fixed as a pivoting link to a first mobile partition.

Use of the same actuator minimises the number of actuators needed to perform the preferred function.

In a fourth aspect of the cascade, the cascade can comprise at least one pair of translation systems of first partitions, the translation systems of the same pair of systems being connected to the same first mobile partitions.

Using two translation systems to shift the same first mobile partition or the same first mobile partitions allows for two fastening points on the first mobile partitions and accordingly reduces mechanical stresses imposed on a same fastening point and reduces deformations in the first mobile partitions during translations.

In a fifth aspect of the cascade, according to the first direction said at least one first mobile partition can comprise a first and second ends, the first ends of the tie rods of a first system of a pair of systems being fixed as a pivoting link to the first ends of first mobile partitions and the first ends of the tie rods of a second system of the same pair of systems being fixed as a pivoting link to the second ends of the same first mobile partitions.

Connecting the translation systems of the same pair of systems to both ends of the first mobile partitions of the cascade makes translations easy by minimising bending stresses in the mobile partitions.

In a sixth aspect of the cascade, the actuators of the translation systems of the same pair of translation systems can be connected together mechanically.

Connecting the actuators of the translation systems of the same pair of translation systems produces precise synchronisation of bending stresses in the first mobile partitions and friction forces.

In a seventh aspect of the cascade, the tie rods connected to first partitions arranged between two fixed walls successively arranged in the second direction have a length between a half and all the distance separating said two successive fixed walls.

In an eighth aspect of the cascade, more than two first mobile partitions are arranged between two fixed walls successively arranged in the second direction, and the tie rods connected to first partitions arranged between said two successive fixed walls have lengths different to each other.

In a ninth aspect of the cascade, the actuator of the at least one translation system can be a pneumatic or electric actuator configured to move the first mobile partitions away from each other as far as the first position or move them more closely to each other as far as the second position.

In a tenth aspect of the cascade, the thickness of the first partitions can be between 0.5 mm and 4 mm to be the finest possible so as to minimise mass and load losses in the cascade. The thickness of the first partitions is measured according to the second direction.

In an eleventh aspect of the cascade, the cascade can comprise stops positioned on the cascade for stopping the translation of the first mobile partitions in the first position to produce precise positioning.

In another aim of the invention, a thrust reversal cascade device for a turbomachine of an aircraft is proposed, characterised in that it comprises at least one cascade such as defined hereinabove.

In a first aspect of the thrust reversal device, the actuator of said at least one translation system is configured to move the first mobile partitions away from each other as far as the first position or move them more closely to each other as far as the second position in a synchronised manner with triggering of the thrust reversal device.

Synchronising the actuator with triggering of the thrust reversal device exerts translation force on all the link points for deploying or replier the mobile partition structure as a function of the operating mode of the thrust reversal device, where the thrust reversal device can be inactive, that is, in acoustic treatment mode, or active, that is, in thrust reversal mode.

In yet another aim of the invention a turbomachine intended to be mounted on an aircraft is proposed, the turbomachine comprising a nacelle in rotational symmetry defining an axial direction and a radial direction, the nacelle comprising a thickness according to the radial direction and a housing extending according to the axial direction in its thickness for receiving a cascade of a thrust reversal cascade device.

According to a general characteristic of this aim of the invention, the turbomachine can comprise a thrust reversal cascade device such as defined hereinabove, the cascade being arranged, when the thrust reversal is not required, in the corresponding housing of the nacelle of the turbomachine with the first partitions extending according to the axial direction and the radial direction and the second partitions extending according to the radial direction and according to a direction orthogonal to the axial direction and to the radial direction, the first direction corresponding to the axial direction.

In an embodiment of the turbomachine, the nacelle can comprise a perforated wall forming a radially internal wall of the housing, and a reflecting wall forming a radially external wall of the housing.

In another aim of the invention, an aircraft comprising at least one turbomachine such as defined hereinabove, is proposed.

BRIEF DESCRIPTION OF THE DRAWINGS

FIGS. 3A and 3B show schematic sectional views according to a plane comprising the axial direction and orthogonal to the radial direction of a cascade of a thrust reversal device for a turbomachine according to a first embodiment of the invention in an inactive thrust reversal position and in an activated thrust reversal position respectively.

FIG. 4 shows a schematic sectional view according to a plane comprising the axial direction and the radial direction of a cascade of a thrust reversal device for a turbomachine according to an embodiment of the invention.

DESCRIPTION OF THE EMBODIMENTS

FIGS. 3A and 3B show schematic sectional views according to a plane comprising the axial direction and orthogonal to the radial direction of a cascade of a thrust reversal device of a turbomachine according to an embodiment of the invention in an inactive thrust reversal position and in an activated thrust reversal position respectively.

Figure 1A:
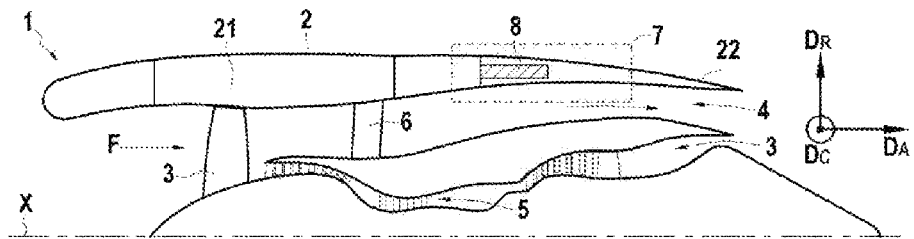
FIGS. 1A and 1B, already described, show schematic sectional views in a longitudinal plane of a turbomachine according to a first embodiment known from the prior art in an inactive thrust reversal position and in an activated thrust reversal position respectively.
Figure 1B:
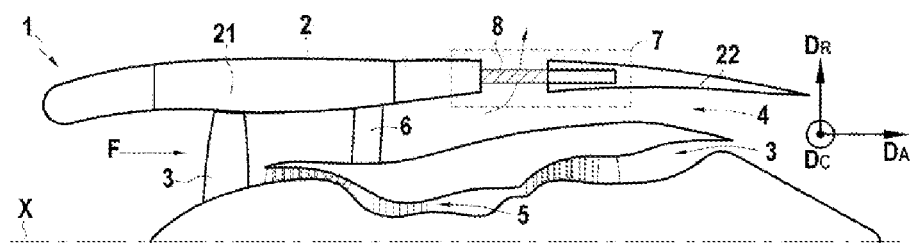
Figure 2A:
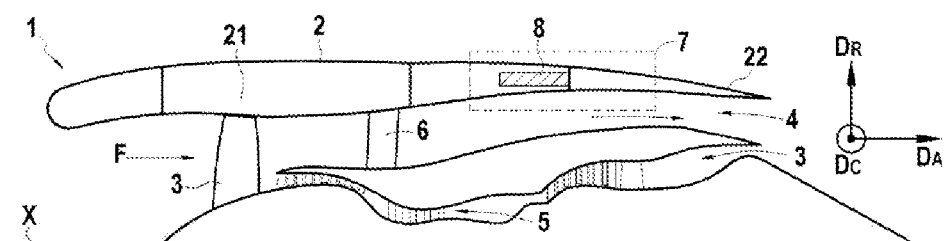
FIGS. 2A and 2B, already described, show schematic sectional views in a plane longitudinal of a turbomachine according to a second embodiment known from the prior art in an inactive thrust reversal position and in an activated thrust reversal position respectively.
Figure 2B:
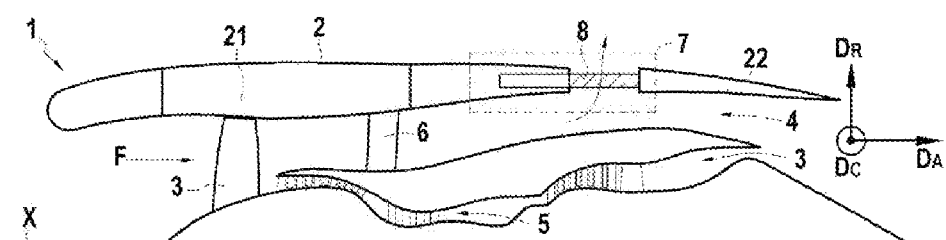

The turbomachine comprises a thrust reversal device which can operate according to the operation described in FIGS. 1A and 1B or according to the operation described in FIGS. 2A and 2B.

The thrust reversal device comprises a plurality of cascades 80 assembled to form a latticed crown. Each cascade 80 comprises a frame 81 inside which first partitions 82 extend in a first direction and second partitions 83 extend in a second direction orthogonal to the first direction.

Also, as illustrated in FIGS. 3A and 3B in the first direction the frame comprises two fixed lateral walls 810 and a fixed central wall 815 dividing the cascade into two rectangular zones 800 in the second direction having a length equal to half the length of the frame 81.

As is illustrated in FIG. 4 which shows a schematic sectional view, according to a plane comprising the first direction and a third direction orthogonal to the first and second directions of the cascade 80 of FIGS. 3A and 3B, the frame 81 and the first and second partitions 82 and 83 extend in a third direction orthogonal to the first and second directions. The first partitions 82 have a height H of between 10 mm and 300 mm.

As is also illustrated in FIG. 4, each of the first partitions 82 comprises notches 820 configured to house one of the second partitions 83. In each of the notches 820 the first partitions 82 also comprise a brush seal 825 or tongue seals mounted on the first partition 82.

The thickness of the first partitions 83 is between 0.5 mm and 4 mm to be the finest possible so as to minimise mass and load losses in the cascade.

When the thrust reversal device is mounted on a turbomachine such as those illustrated in FIGS. 1A, 1B, 2A, 2B, the first direction corresponds to the axial direction $D_A$ of the turbomachine 1, the second direction corresponds to the circumferential direction $D_C$ of the turbomachine 1, and the third direction corresponds to the radial direction $D_R$ of the turbomachine 1.

The second partitions 83 are azimuthal partitions intended to orient the gas flow F to the outside of the nacelle 2 and to upstream of the turbomachine 1 for thrust reversal when the thrust reversal device is activated. The first partitions 82 are axial partitions intended to define, with the second partitions 83, resonating cavities 84 for absorption of acoustic waves generated by the turbomachine, when the thrust reversal device is inactive.

As is illustrated in FIGS. 3A and 3B, the first partitions 82 can travel along the second partitions 83, that is, according to the second direction $D_C$, between a first position illustrated in FIG. 3A in which the second partitions 83 are spaced uniformly from each other according to the second direction $D_C$ to form a plurality of resonating cavities 84, and a second position illustrated in FIG. 3B in which the first partitions 82 are folded back equally as a group against the fixed walls 810 and 815 of their rectangular zone 800 to have just a single cell extending in the first direction $D_A$ between two second partitions 83 or else between a second partition 83 and the frame 81.

In the example illustrated in FIGS. 3A and 3B, in the second position, in each rectangular zone 800, two first mobile partitions 82 are arranged against the fixed lateral wall 810 and two first mobile partitions 82 are arranged against the fixed central wall 815. In the first position, in each rectangular zone 800, the four first mobile partitions 82 are spaced uniformly in the second direction to form identical resonating cavities 84 with the second partitions 83.

FIG. 3B illustrates the cascade 80 in an active position of the thrust reverser, that is, in a position where the cascade 80 has exited from a housing 25 provided in the thickness of the nacelle 2 for receiving the cascade 80 when the thrust reverser is inactive. The housing 25 comprises an opening 250 for insertion of the cascade 80 into the housing 25 according to the axial direction $D_A$, a back wall 252 extending in the radial direction $D_R$ opposite the opening 250, and a perforated wall and a reflecting wall parallel to each other and extending in the axial direction $D_A$ and in the circumferential direction $D_C$. The perforated wall and the reflecting wall are not shown in FIGS. 3A and 3B, given that these figures are sectional views. The perforated wall is radially inside the reflecting wall. When the cascade is inserted into the housing the perforated and reflecting walls now form resonating cavities of Helmholtz resonator type provided with a volume and a neck formed by each of the openings of the perforated wall.

Figure 5B:
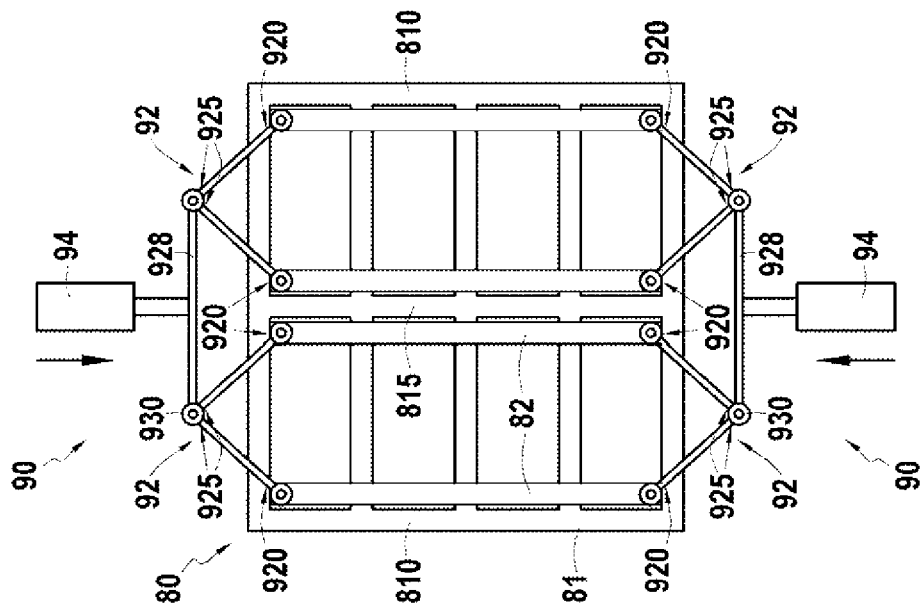
FIGS. 5A and 5B show schematic sectional views according to a plane comprising the axial direction and orthogonal to the radial direction of a cascade of a thrust reversal device for a turbomachine according to a second embodiment of the invention in an inactive thrust reversal position and in an activated thrust reversal position respectively.
Figure 5A:
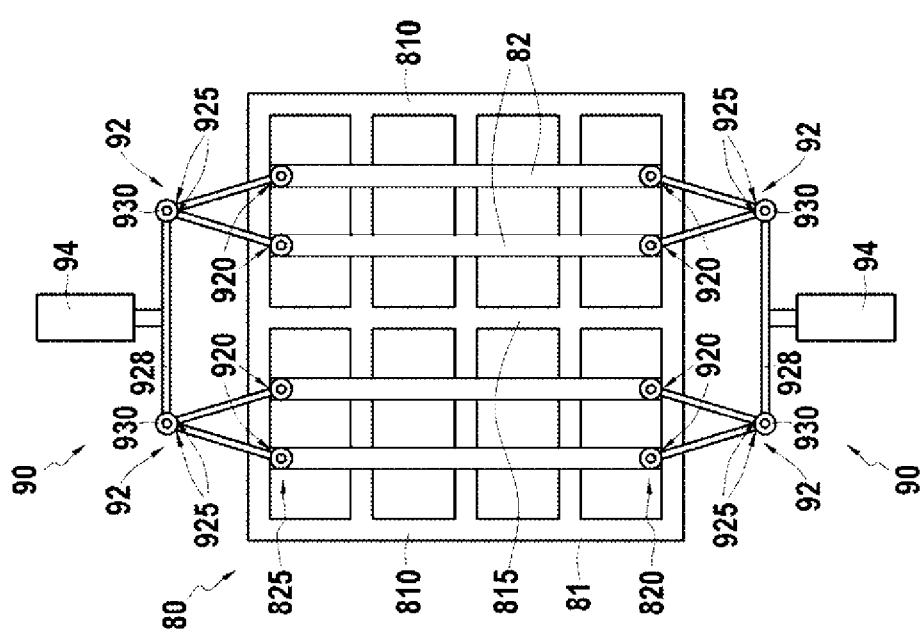

FIGS. 5A and 5B illustrate schematic sectional views according to a plane comprising the axial direction and orthogonal to the radial direction of a cascade of a thrust reversal device for a turbomachine according to a second embodiment of the invention in an inactive thrust reversal position and in an activated thrust reversal position respectively.

In this embodiment, each rectangular zone 800 comprises two first mobile partitions 82. The rectangular zones 800 could comprise a larger even number of first mobile partitions 82.

In the second embodiment illustrated in FIGS. 5A and 5B, the cascade 80 comprises a first and a second translation system 90 controlling movement in the second direction $D_C$ of the two first mobile partitions 82. The two translation systems 90 are joined together to be actuated together in a synchronised manner. They are also synchronised with the thrust reversal device to shift the first mobile partitions 82 into the first position when the thrust reversal device switches to inactive mode, that is, to an operating mode specific to the acoustic treatment of sound waves emitted by the turbomachine, or into the second position when the thrust reversal device switches to active mode, that is, to an operating mode for thrust reversal.

Each translation system 90 comprises tie rods 92 and an actuator 94. Each tie rod 92 comprises a first end 920 coupled as a pivoting link at one end, according to the first direction $D_A$, of a first mobile partition 82. In the first direction $D_A$ each first partition 82 comprises a first end 820 and a second end 825. The first end 920 of the tie rods 92 of the first translation system 90 is connected as a pivoting link to the first end 820 of the first mobile partitions 82 and the first end 920 of the tie rods 92 of the second translation system 90 is connected as a pivoting link to the second end 825 of the first mobile partitions 82.

Each tie rod 92 comprises a second end 925 opposite the first end 920. The second ends 925 of each of the tie rods 92 of a translation system 90 are connected together mechanically to connect them to the actuator 94.

In the example illustrated in FIGS. 5A and 5B, each translation system 90 comprises two first and two second tie rods 92. The second ends 925 of the two first tie rods 92 are connected together in a first common pivoting link 930, and the second ends 925 of the two second tie rods 92 are connected together in a second common pivoting link 930. The two common pivoting links 930 are coupled to the actuator 94 via a link bar 928.

The actuator 94 of the first translation system 90 and the actuator 94 of the second translation system 90 are joined together, so much so that when the actuators 94 are activated, following a request to switch to thrust reversal, each actuator 94 pushes the link bar 928 towards the frame 81 of the cascade 80; in other words the actuators 94 of the two translation systems 90 push the two link bars 928 towards each other.

This action initiates deployment of the tie rods 92, that is, moving of the first ends 920 of the tie rods away from each other having their second end 925 connected together in the same common pivoting link 930. This deployment of the tie rods 92 causes each of the two first mobile partitions 82 to move towards a fixed wall 810 or 815.

When the actuators 94 are deactivated, following a request to switch to thrust reversal, each actuator 94 pulls the link bar 928 back in a direction opposite the frame 81 of the cascade 80; in other words the actuators 94 of the two translation systems 90 move the two link bars 928 away from each other.

This action causes contraction of the tie rods 92, that is, moving of the first ends 920 of the tie rods more closely to each other having their second end 925 connected together in the same common pivoting link 930. This moving together of the tie rods 92 causes each of the two first mobile partitions 82 of the fixed walls 810 or 815 to move apart to the point of forming resonating cavities of the same volume with the second partitions 83.

The invention therefore provides a cascade of a cascade thrust reverser which, when the cascade is mounted in a thrust reverser of a turbomachine, both reorients a flow of air in the upstream direction of the turbomachine outside the nacelle, minimises load losses through the cascade and maximises acoustic absorption efficiency.

The invention claimed is:

1. A cascade for a thrust reversal device to be mounted on a turbomachine of an aircraft, the cascade comprising first partitions extending in a first direction, second fixed partitions extending in a second direction orthogonal to the first direction, and a frame inside which the first partitions and the second fixed partitions extend, the frame comprising at least two fixed walls extending according to the first direction, and at least one part of each first partition extending between two of the second fixed partitions in a plane comprising the first and second directions, wherein at least one of said first partitions is mobile according to the second direction between a first position wherein said at least one of said first partitions is distant, in the second direction, from said fixed walls of the frame to form a plurality of resonating cavities with the first partitions and/or the fixed walls of the frame, and a second position wherein said at least one of said first partitions is in contact with one of said at least two fixed walls of the frame or another first partition of said first partitions.

2. The cascade according to claim 1, wherein each first mobile partition comprises notches configured to house at least one of said second fixed partitions and allow said first mobile partition to move along the second partitions, and each notch comprises a seal for sealing the notch.

3. The cascade according to claim 2, wherein the seals of the notches are brush seals or tongue seals.

4. The cascade according to claim 1, wherein said at least one mobile first partition comprises at least two mobile first partitions and at least one translation system of said mobile first partitions comprising an actuator and at least two tie rods comprising first and second ends, the second ends of the tie rods of the at least one translation system being connected together via at least one common pivot link connected to the actuator, and the first end of each tie rod of the at least one translation system being fixed as a pivoting link to one of said mobile first partitions.

5. The cascade according to claim 4, also comprising at least one pair of said at least one translation systems of said mobile first partitions, the at least one pair of translation systems being connected to the same first partitions.

6. The cascade according to claim 5, wherein said at least one of said mobile first partitions comprises, according to the first direction, a first end and a second end, the first end of the tie rods of a first translation system of said at least one pair of translation systems being fixed as a pivoting link to the first end of the at least one of said first mobile partitions and the first end of the tie rods of a second translation system of said one of said at least one pair of translation systems being fixed as a pivoting link to the second end of the same first mobile partitions.

7. The cascade according to claim 5, wherein the actuators of the at least one pair of translation systems are connected together mechanically.

8. The cascade according to claim 4, wherein the at least two tie rods are arranged between said at least two fixed walls successively arranged in the second direction and have a length between a half and all the distance separating said two successive fixed walls.

9. The cascade according to claim 4, wherein more than two of said mobile first partitions are arranged between said at least two fixed walls successively arranged in the second direction, and wherein the at least two tie rods are arranged between said at least two fixed walls have lengths different to each other.

10. The cascade according to claim 4, wherein the actuator of the at least one translation system is a pneumatic or electrical actuator configured to move the first mobile partitions away from each other as far as the first position or move them more closely to each other as far as the second position.

11. The cascade according to claim 1, wherein the thickness of the first partitions is between 0.5 mm and 4 mm, the thickness of the first partitions being measured according to the second direction.

12. The cascade according to claim 4, also comprising stops positioned on the cascade for stopping the translation of the mobile first partitions in the first position.

13. A cascade thrust reversal device for a turbomachine of an aircraft, wherein said cascade thrust reversal device comprises at least one cascade according to claim 1.

14. A thrust reversal cascade device according to claim 13, wherein an actuator of said at least one translation system is configured to move two of the at least one first mobile partitions away from each other as far as the first position or move them closer to each other as far as the second position in a synchronised manner with triggering of the thrust reversal device.

15. A turbomachine to be mounted on an aircraft, the turbomachine comprising a nacelle in rotational symmetry defining an axial direction and a radial direction, the nacelle comprising a thickness according to the radial direction and a housing extending according to the axial direction in its thickness for receiving a cascade of a thrust reversal cascade device,
  wherein said turbomachine comprises the cascade thrust reversal device according to claim 13, the cascade being arranged, when thrust reversal is not required, in the housing of the nacelle of the turbomachine with the first partitions extending according to the axial direction and the radial direction and the second partitions extending according to the radial direction and according to a direction orthogonal to the axial direction and to the radial direction, the first direction corresponding to the axial direction.

16. The turbomachine according to claim 15, wherein the nacelle comprises a perforated wall forming a radially internal wall of the housing and a reflecting wall forming a radially external wall of the housing.

17. An aircraft comprising at least one turbomachine according to claim 15.

* * * * *